United States Patent [19]

Davis

[11] Patent Number: 5,341,400
[45] Date of Patent: Aug. 23, 1994

[54] METHOD AND APPARATUS FOR AUTOMATICALLY SENSING AND CONFIGURING A TERMINATION IN A BUS-BASED NETWORK

[75] Inventor: Eric R. Davis, San Jose, Calif.
[73] Assignee: 3COM Corporation, Santa Clara, Calif.
[21] Appl. No.: 921,883
[22] Filed: Jul. 29, 1992
[51] Int. Cl.5 .............. H04B 3/00; H04B 14/04
[52] U.S. Cl. ...................... 375/36; 370/85.1; 370/85.12; 340/825.06
[58] Field of Search .............. 375/36; 340/825.05, 340/825.06; 370/85.1, 85.12, 85.14, 85.13

[56] References Cited

U.S. PATENT DOCUMENTS

| | | | |
|---|---|---|---|
| 4,647,912 | 3/1987 | Bates et al. | 375/36 X |
| 4,803,485 | 2/1989 | Rypinski | 375/36 X |
| 5,119,402 | 6/1992 | Ginzberg et al. | 375/36 X |
| 5,125,006 | 6/1992 | Marinaro | 375/36 X |
| 5,132,987 | 7/1992 | Motohashi et al. | 375/36 X |

*Primary Examiner*—Stephen Chin
*Assistant Examiner*—Bryan Webster
*Attorney, Agent, or Firm*—Townsend and Townsend Khourie and Crew

[57] ABSTRACT

A method and an apparatus for automatically sensing and configuring a termination in a network bus configuration are provided by input logic signals indicating whether or not a device connected to the network bus is located at an end position. If the device is at an end position, the network is automatically terminated by a matched load impedance located in the device. Because the load resistance at the ends of the network match the impedance of the communication medium, data loss due to signal reflections is eliminated.

22 Claims, 2 Drawing Sheets

1

METHOD AND APPARATUS FOR AUTOMATICALLY SENSING AND CONFIGURING A TERMINATION IN A BUS-BASED NETWORK

BACKGROUND OF THE INVENTION

This invention relates to local area networks and particularly to connections between nodes in bus-type local area networks. When signals are transmitted in a local area network (LAN) certain problems arise due to imperfect electrical termination of the wire medium used for transmitting the signals. In particular, data errors may result from signal reflections caused by a mismatch between the characteristic impedance of the wire communications medium and the impedance at the ends of the network. In order to overcome this problem, the ends of the network must be terminated properly in an impedance which matches the characteristic impedance of the medium. Proper termination may be accomplished by inserting a resistive impedance load having the same impedance as the characteristic impedance of the transmission wire at each end of the network. When this resistive load is driven by a reference voltage, it matches the characteristic impedance of the transmission wire, thus effectively removing reflections which may cause data loss. For example, if a transmission cable is used which has an impedance of 100 Ω, then a 100 Ω termination resistor may be inserted at the ends of the cable.

A problem arises where an end of a LAN is moved due to the connection of another device to the chain of devices which form the network. A common way that this problem has previously been overcome has been the manual placement of a terminator cap on the end of the chain following the last device. This adds extra costs and the possibility for damage or error due to the need to manually identify the end of the chain. Moreover, the terminator caps may be inadvertently removed or disconnected, threatening the performance of the entire LAN.

What is needed is a mechanism for eliminating the source of potential failure in a LAN connected through a wire medium.

SUMMARY OF THE INVENTION

According to the invention, in a local area network (LAN) having a wire communications medium between a plurality of devices, the wire communications medium having a first end and a second end each requiring impedance-matched termination, an apparatus in each one of the devices provides automatic sensing of position and insertion of a matched load for selective impedance-matched termination. A specific embodiment employs a matched load termination for the wire communications medium, means coupled to the matched load termination for connecting the matched load termination to the wire communications medium, and means coupled to the connecting means for enabling the connecting means where the device is most closely adjacent one of the first end and the second end, and for disabling the connecting means where the device is not most closely adjacent one of the first end and the second end. Also disclosed is a method for providing selective impedance-matched termination at any one of the devices of the LAN comprising steps of sensing at each one of the devices whether the device is most closely adjacent one of the ends and thereupon connecting a matched load termination within the device to the wire communications medium; otherwise isolating the matched load termination in the device from the wire communications medium where the device is not most closely adjacent one of the first end and the second end.

In a specific embodiment, the apparatus is daisy chained, and two terminations are provided in each device to be connected to the LAN.

DESCRIPTION OF THE PREFERRED EMBODIMENT

Figure 1:
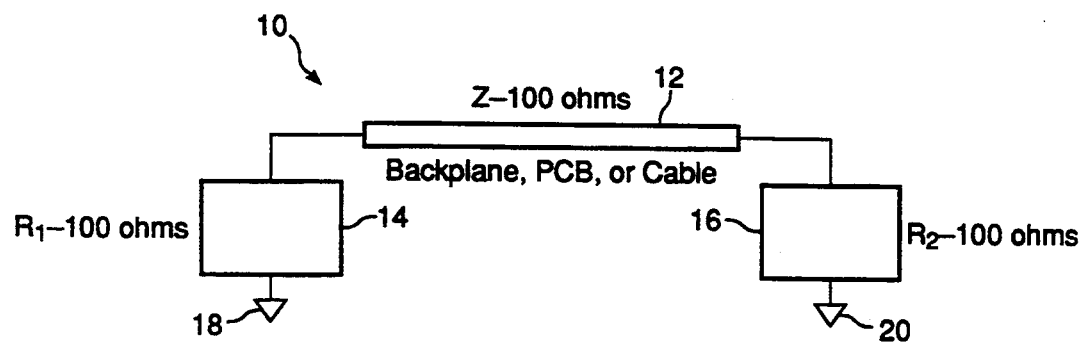
FIG. 1 illustrates a local area network configuration according to the invention.

FIG. 1 illustrates a local area network having a wire communications medium 10. The wire communications medium 12 may comprise a backplane, a printed circuited board (PCB) or a cable. In the diagram, the communications medium 12 has a characteristic impedance Z equal to 100 Ω. In order to prevent reflections, the two ends of the network are terminated with resistive loads 14 and 16 ($R_1$ and $R_2$), which match the characteristic impedance of the communications medium 12. The terminating resistive loads 14 and 16 are connected to ground 18 and 20.

Figure 2:
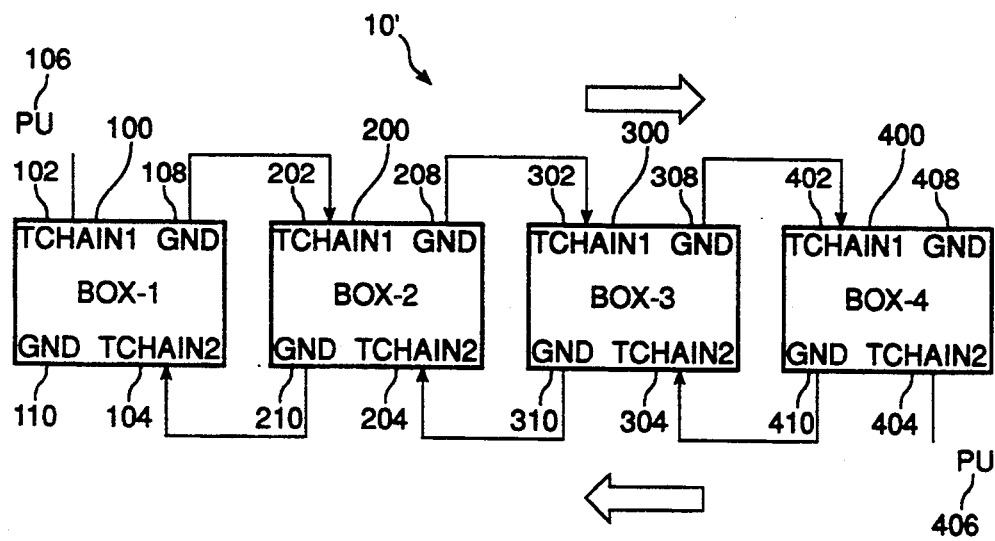
FIG. 2 illustrates a network configuration incorporating one embodiment of the present invention.

FIG. 2 illustrates a LAN 10' comprised of four devices, 100, 200, 300 and 400 (BOX-1 through BOX-4 respectively) which incorporate the present invention. Each box is interconnected with a next adjacent box to form a network 10'. Each box is interconnected to the next box via two inputs TCHAIN1 (102, 202, 302, and 402) and TCHAIN2 (104, 204, 304, 404) forming two daisy chained control paths. These inputs indicate the presence or absence of a preceding or subsequent device in the network.

The forward daisy chain begins with control input 102 of device 100 (TCHAIN1 of BOX-1) which is pulled up to a logic high signal by a pull up 106 (PU) located in device 100 (BOX-1). The pull up may be any pull up circuit or equivalent known in the art. The forward daisy chain continues with connection between the ground output 108 of device 100 (BOX-1) and control input 202 of device 200 (TCHAIN1 of BOX-2). It further continues with the connection between the ground output 208 of device 200 (BOX-2) and the control input 302 of device 300 (TCHAIN1 of BOX-3). Thus, the first control inputs 202 and 302 to devices 200 and 300 are both held low. The forward daisy chain ends with control input 402 of device 400 (TCHAIN1 of BOX-4) which is held low by connection to ground output 308 of device 300. Thus, the only device in which TCHAIN1 remains high is device 100 (BOX-1), which has no preceding device in the network.

The backward daisy chain is connected via second control inputs 104, 204, 304 and 404 (TCHAIN2 of BOX-1 through BOX-4). The input 404 to the last device in the chain 400 is internally pulled high by pull up 406 (PU). Because device 400 (BOX-4) is the last device in the chain, there is no connection to input 404 which would indicate a subsequent device. Therefore, control input 404 remains high. However, because devices 100, 200, and 300 (BOX-1, BOX-2 and BOX-3) are followed in the chain by a subsequent device, the inputs to these devices, 104, 204, and 304, are held low by connection to the ground outputs 210, 310, and 410 of the respective subsequent devices.

In the four device network illustrated, devices 100, 200, 300 and 400 can be used to form a repeater 10'. According to this embodiment, each of the four devices is a twelve port repeater. Linked together in a hub, the network forms a forty-eight port repeater in which each repeater 100, 200, 300 and 400 can communicate among each other through the connecting medium 50. However, the present invention is not limited to use in conjunction with any one type of device, nor any specific number of devices.

Figure 3:
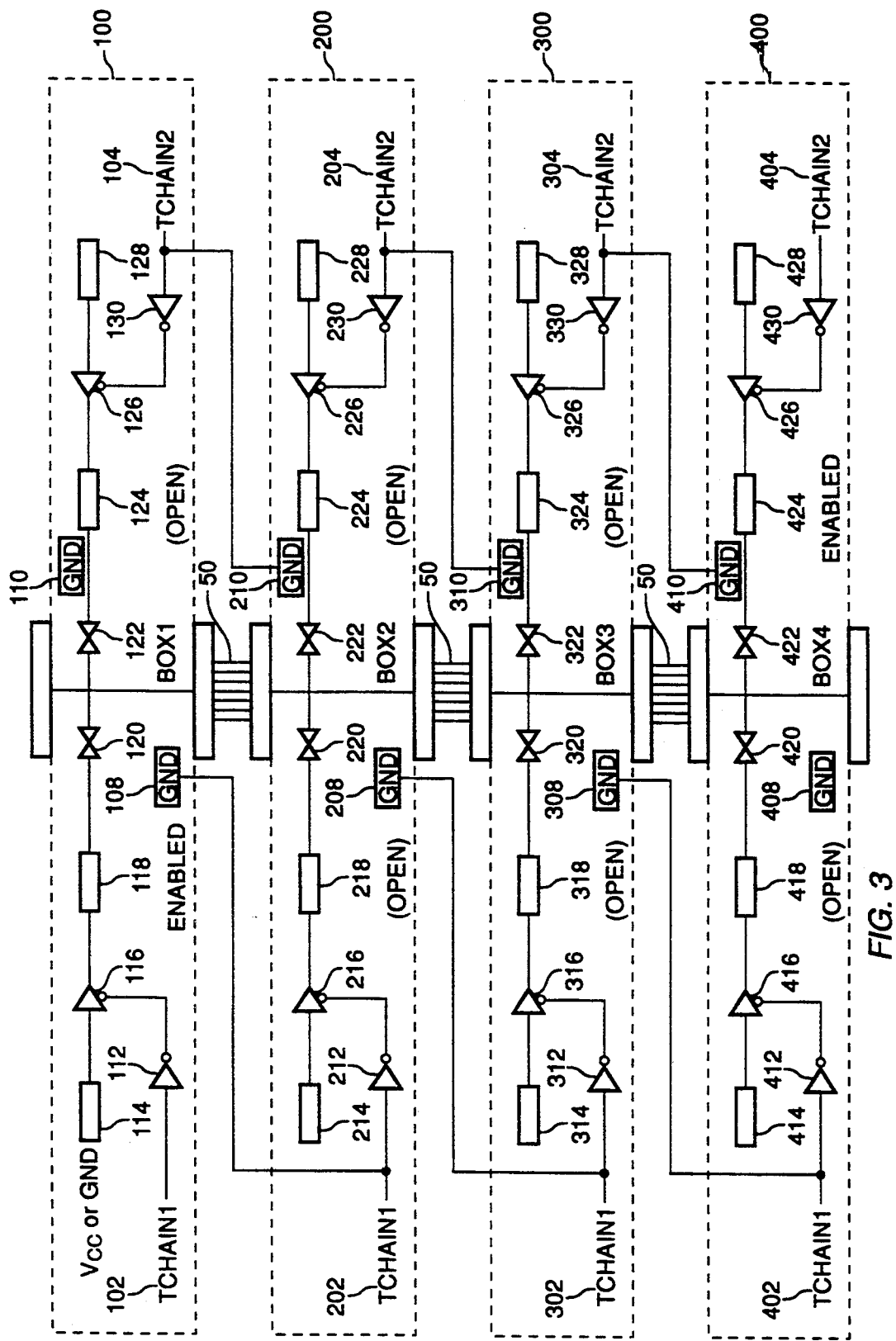
FIG. 3 illustrates a detailed embodiment of the present invention.

FIG. 3 further illustrates an embodiment in which control signals selectively terminate the ends of the LAN with a resistive load impedance located within the devices 100, 200, 300 and 400, depending on the logic state of their respective control inputs TCHAIN1 and TCHAIN2. In this way, the signal being transmitted through the LAN (illustrated at points 120, 122, 130, 132, 140, and 142) along medium 50 is properly terminated.

In this embodiment, because input 102 of device 100 is high, three-state buffer 112 coupled between the reference voltage 114 and matched load resistor 118 is enabled. Switch 116 then closes a path to the signal at point 120, and reference voltage 114 drives resistor 118 which has an impedance of approximately the same value as the characteristic impedance of the wire communications medium 50.

Continuing forward along the daisy chain, the control input 202 of device 200 is connected to ground output 108 of preceding device 100, and therefore after the signal at input 202 is inverted, a high logic signal is input to three-state buffer 216 which is disabled. Switch 216 is thus open, and the reference voltage 214 can not drive matched impedance load resistor 218. Accordingly, the load resistor 218 is isolated from the signal at point 220. The control inputs 302 and 402 of both devices 300 and 400 similarly detect a preceding device and therefore disable buffers 316 and 416. This removes the matched load resistors 318 and 418 from the signal at the points 320 and 420.

The backward daisy chain determines whether there is a subsequent device, and either inserts or removes a termination in the same manner. Because device 100 is connected to a subsequent device 200 by control input 104 and ground output 210, the input 104 to the three state buffer 130 is low. Buffer 130 inverts this signal, thereby disabling three-state buffer 126, and isolating matched load resistor 124 from the signal 122. The same occurs in devices 200 and 300. However, because there is no device subsequent to device 400, buffer 426 is enabled and reference voltage 428 drives matched load resistor 424, effectively terminating the other end of the network.

In this manner, a signal being transmitted through the repeater is properly terminated at both ends of the LAN 10'. Additional signals transmitted in a bus network may likewise be terminated by using apparatuses equivalent to that shown in FIG. 3.

The invention has now been described with reference to specific embodiments. Other embodiments will be apparent to those of ordinary skill in the art. It is therefore not intended that this invention be limited, except as indicated in the appended claims.

What is claimed is:

1. In a local area network (LAN) having a wire communications medium between a plurality of devices, said wire communications medium having a first end and a second end, said LAN requiring at each end an impedance-matched termination, an apparatus in each one of said devices for providing selective impedance-matched termination at any one of said devices comprising:

a matched termination load for said wire communications medium;

means coupled to said matched termination load for connecting said matched termination load to said wire communications medium; and means coupled to said connecting means for sensing when said device is most closely adjacent to one of said first end and said second end, said sensing means enabling said connecting means where a device is most closely adjacent to one of said first end and said second end, and disabling said connecting means where said device is not most closely adjacent to one of said first end and said second end.

2. The apparatus according to claim 1, wherein said matched termination load is a resistive load impedance element having the same characteristic impedance as said wire communications medium, said resistance element is coupled to a termination reference voltage.

3. The apparatus according to claim 2, wherein said connecting means comprises a switch for coupling a termination reference voltage to said resistive load impedance element such that said termination reference voltage can drive said wire communications medium through said resistive load impedance element.

4. In a local area network (LAN) having a wire communications medium between a plurality of devices, said wire communications medium having a first end and a second end, said LAN requiring at each end an impedance-matched termination, an apparatus in each one of said devices for providing selective impedance-matched termination at any one of said devices comprising:

a matched termination load for said wire communications medium;

means coupled to said matched termination load for connecting said matched termination load to said wire communications medium, said connecting means comprises a three-state buffer coupled between a termination reference voltage and said matched termination load such that said termination reference voltage can drive said wire communications medium through said matched termination load; and means coupled to said connecting means for enabling said connecting means where a device is most closely adjacent to one of said first end and said second end, and for disabling said connecting means where said device is not most closely adjacent to one of said first end and said second end.

5. The apparatus according to claim 4, wherein said enabling/disabling means comprises means supplying a logic one of said first end and said second end, and for disabling said connecting means where said device is not most closely adjacent to one of said first end and said second end.

6. The apparatus according to claim 4, wherein said matched termination load comprises a first resistive impedance element coupled to said wire communications medium and a second resistive element coupled to said wire communications medium.

7. The apparatus according to claim 6, wherein said connecting means comprises a first three-state buffer coupled between a termination reference voltage and said first resistive impedance element such that the termination reference voltage can drive said wire communications medium through said first resistive reference impedance, and a second three-state buffer coupled between a termination reference voltage and said second resistive impedance element such that the termination reference voltage can drive said wire communications medium through said second resistive reference element.

8. The apparatus according to claim 7, wherein said enabling/disabling means comprises means supplying a logic signal to a control input of each one of said three-state buffers for enabling or disabling each said three-state buffer.

9. The apparatus according to claim 8, wherein at least first, second and last devices are connected in a daisy chain, wherein said wire communications medium provides a forward daisy chain control line path and a backward daisy chain control line path;

wherein each device has a first control input connection to said first three-state buffer and a second control input connection to said second three-state buffer, a first output control connection coupled from a disabling control reference voltage, and a second output control connection coupled from a disabling control reference voltage; and wherein said enabling/disabling means comprises a signal connection between each said first output connection to a next subsequent first input connection in said first daisy chain path, and a signal connection between each said second output connection and a next subsequent second input connection in said backward daisy chain path in order to disable each said matched termination load not adjacent to said first end or to said second end, and an enabling signal which is supplied to the first control input of said first device, and an enabling signal which is supplied to the second control input of said last device in order to enable the matched load termination of each said daisy chain path.

10. The apparatus according to claim 4, wherein each device is a twelve port repeater linked by said wire communications medium to form a forty-eight port repeater.

11. In a local network (LAN) having a wire communications medium between a plurality of devices, said wire communications medium having a first end and a second end each, said LAN requiring at each end an impedance-matched termination, a method for providing selective impedance-matched termination at any one of said devices comprising the steps of:

sensing at each one of said devices whether said device is most closely adjacent to one of said first end and said second end;

connecting a matched termination load within said device to said wire communications medium where said device is most closely adjacent to one of said first end and second end; and isolating said matched load termination in said device from said wire communications medium where said device is not most closely adjacent to one of said first end and said second end.

12. The method according to claim 11, wherein said matched termination load is a resistive impedance element having the same characteristic impedance as said wire communications medium, said resistance element is coupled to a termination reference voltage.

13. The method according to claim 12, wherein the connecting step includes a switch for coupling said termination reference voltage to said resistive impedance element such that said termination reference voltage can drive said wire communications medium through said resistive element.

14. In a local area network (LAN) having a wire communications medium between a plurality of devices, said wire communications medium having a first end and a second end each, said LAN requiring at each end an impedance-matched termination, a method for providing selective impedance matched termination at any one of said devices comprising the steps of:

sensing at each one of said devices whether said device is most closely adjacent to one of said first end and said second end;

connecting a matched termination load within said device to said wire communications medium where said device is most closely adjacent to one of said first end and second end said connecting step comprises coupling a three-state buffer between a termination reference voltage and said matched termination load such that said termination reference voltage drives said wire communications medium through said matched termination load; and isolating said matched termination load in said device from said wire communications medium where said device is not most closely adjacent to one of said first end and said second end.

15. The method according to claim 14, wherein the step of isolating said matched termination load from said wire communications comprises supplying a logic signal to said three-state buffer for enabling and disabling said three-state buffer.

16. The method according to claim 14, wherein said matched termination load comprises a first resistive impedance element coupled to said wire communications medium and a second resistive element coupled to said wire communications medium.

17. The method according to claim 16, wherein the step of connecting a matched termination load within said device to said wire communications medium comprises coupling a first three-state buffer coupled between a termination reference voltage and said first resistive impedance element such that the termination reference voltage can drive said wire communications medium through said first resistive reference impedance, and coupling a second three-state buffer between a termination reference voltage and said second resistive impedance element such that the termination reference voltage can drive said wire communications medium through said second resistive reference element.

18. The method according to claim 17, wherein the step of isolating said matched termination load from said wire communications comprises supplying a logic signal to a control input of each one of said three-state buffers for enabling or disabling each said three-state buffer.

19. The method according to claim 18, wherein at least first, second and last said devices are connected in a daisy chain;

wherein said wire communications medium provides a forward daisy chain control line path and a backward daisy chain control line path, wherein each device has a first control input connection to said first three-state buffer and a second control input connection to said second three-state buffer, a first output control connection coupled from a disabling control reference voltage, and a second output control connection coupled from a disabling control reference voltage; and wherein the step of isolating said matched termination load from said wire communications medium comprises connecting each said first output connection to a next subsequent first input connection in said first daisy chain path, and connecting each said second output connection and a next subsequent second input connection in said backward daisy chain path in order to disable each said matched termination load not adjacent to said first end or said second end, and supplying an enabling signal to the first control input of said first device, and to the second control input of said last device in order to enable the matched termination load of each said daisy chain path.

20. The method according to claim 14, wherein each device is a twelve port repeater linked by said wire communications medium to form a forty-eight port repeater.

21. A local area network (LAN) requiring impedance matched termination, said LAN having a first end and a second end, comprising:

a wire communications medium between a plurality of devices, a matched termination load for said wire communications medium;

means coupled to said matched termination load for connecting said matched termination load to said wire communications medium; and means coupled to said connecting means for sensing when a device is most closely adjacent to one of said first end and said second end, said sensing means enabling said connecting means where said device is most closely adjacent to one of said first end and said second end, and disabling said connecting means where said device is not most closely adjacent to one of said first end and said second end.

22. A local area network (LAN) requiring impedance matched termination, said LAN having a first end and a second end, comprising:

a wire communications medium between a plurality of devices, each of said plurality of devices is a twelve port repeater combined to form a forty-eight port repeater;

a matched termination load for said wire communications medium;

means coupled to said matched termination load for connecting said matched termination load to said wire communications medium; and means coupled to said connecting means for enabling said connecting means where a device is most closely adjacent to one of said first end and said second end, and for disabling said connecting means where said device is not most closely adjacent to one of said first end and said second end.

* * * * *